March 12, 1957      J. H. MacMILLAN, JR      2,784,691

WATER CRAFT HULL TUNNEL AND PROPELLER ARRANGEMENT

Filed Jan. 21, 1953      2 Sheets-Sheet 1

Inventor:
John H. MacMillan, Jr.
By: Whiteley & Caine
Attorneys

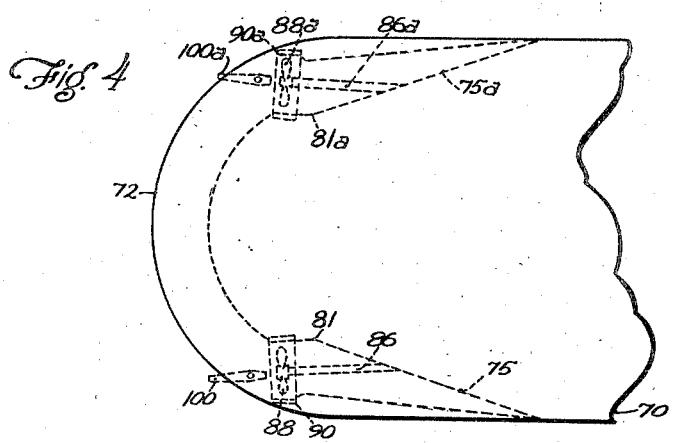
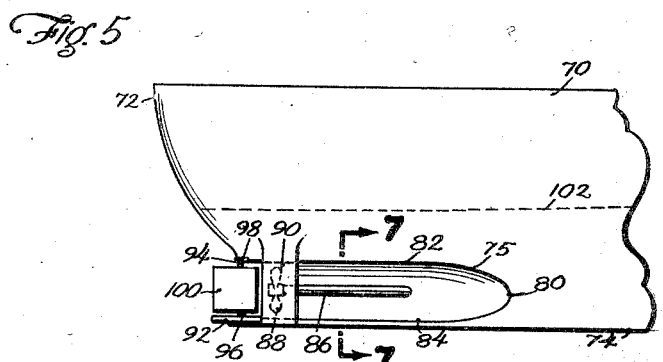
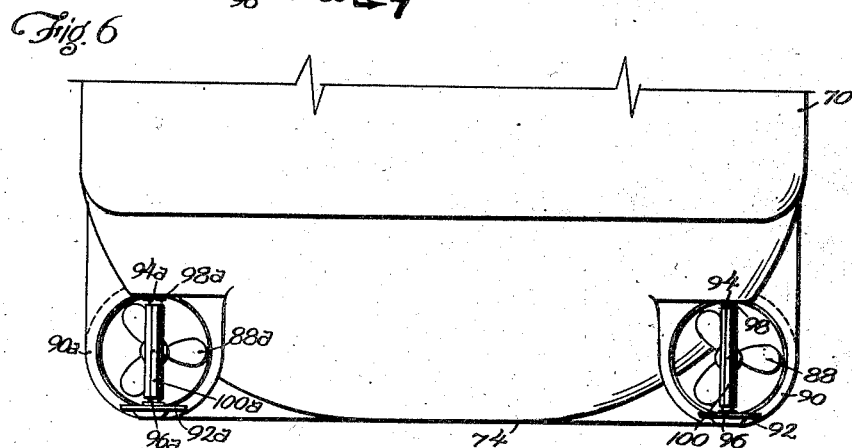
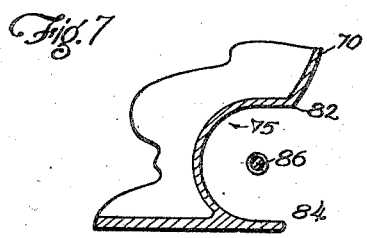

United States Patent Office 2,784,691
Patented Mar. 12, 1957

2,784,691

WATER CRAFT HULL TUNNEL AND PROPELLER ARRANGEMENT

John H. MacMillan, Jr., Wayzata, Minn., assignor to Cargill, Incorporated, Minneapolis, Minn., a corporation of Delaware Application January 21, 1953, Serial No. 332,454

6 Claims. (Cl. 115—42)

The present invention relates to improvements in the construction of power-driven water craft. In general it is concerned with the construction of a water craft in such a manner as to materially increase the efficiency of propulsion. In particular the invention is concerned with the construction of the hull and the disposition of propulsive means relative to the hull to greatly increase the efficiency of propulsion through a multiple stage effect, and to have the propulsion means operating only upon those portions of the body of water which support the craft that can give a useful effect in propelling the craft through the water.

In the designing of boat hulls in the past it has been the general opinion that propulsive efficiency is related to the amount of wetted surface of the hull. Hulls are designed according to speed requirements and also for the cargo which is to be carried, but it has been the general belief that the greatest efficiency is obtained through the streamlining of the hull to provide a minium wetted surface and also a minimum resistance to the body of water that supports the ship. Although the specific designing of the hull to reduce resistance and also minimize the amount of wetted surface is important, I have established that highly efficient propulsion is obtained through the design of the rear end of the hull and the proper disposition of the propulsion means to act on selected portions of the water body that supports the ship.

I have found that if the rear end of the hull be formed with inwardly sloping surfaces on either side that tend to converge, and the propulsive means is so disposed with relation to these sloping surfaces as to draw water laterally against the sloping surfaces with increasing intensity throughout the run of each of the slopes, the water so drawn from the sides of the boat produces a pinching effect on the rear end of the hull that projects the boat forwardly. Furthermore, if the propulsive means are also disposed to take the converging streams from either side of the boat and divert them directly to the rear of the hull before they have had a chance to intermingle, that a second stage of propulsion will be obtained which when added to the pinching effect mentioned heretofore gives added propulsive efficiency. Still further I have found that the hull and the propulsive means must be so constructed or arranged that only water on either lateral side of the hull above the keel or bottom surface is utilized in giving the propulsive effect. This latter effect is of considerable importance because I have found that water which is drawn to the propulsion means from beneath the boat adds little if anything to the propulsive effect and merely causes a waste of propelling energy. In addition, the drawing of water to the propulsion means from beneath the boat tends to further depress the boat into the body of water, thus increasing its draught which not only decreases the propulsive efficiency but in the case of hulls designed for inland waterways such as rivers and canals, is likely to depress the hull into the bed of the channel. This effect is frequently noted on tow boats used to push a string of barges. If the barges are heavily laden, more energy is required to push them through the water and the tow boat under the added load tends to dig into the body of water. Therefore, if in addition to the added burden of a large tow, the tow boat draws water from beneath its bottom surface, it is not only wasting energy but it is likely to become lodged in the stream of the bed.

To prevent the propulsive means from drawing water from beneath the keel or bottom surface of the boat, a fin or plate may be secured to the hull beneath and forward of the propulsive means and arranged so that the only water drawn to the propulsive means must come from either lateral side of the boat rather than from beneath the keel or bottom surface.

Where twin propulsive means are used on either side of the hull the sloping surfaces cannot actually converge at the propulsive means but nevertheless they can be arranged so that they tend to converge at a common point which would be in front of the rear end of the hull. The sloping surfaces may be formed by constructing flumes or side tunnels in either lateral side of the hull adjacent its rear end and arranged to partially or wholly circumscribe the propulsive means and thus direct the course of the water from the sides of the boat against the inwardly sloping surfaces of the side tunnels so as to produce the aforementioned pinching effect on the rear end of the hull. To produce the secondary effect, the water brought into the side tunnels is diverted in direction and directed to the axes of the propellers which operate in a plane that is substantially transverse to the main axis of the hull and at the rear end of the hull. The side tunnels are also constructed with lower outwardly projecting fins or curved edges to prevent the propulsive means from drawing water beneath the hull.

In either the single or twin propulsive hulls, if relatively small diameter propellers are used, it is desirable to encompass each of such propellers with an annular member that slopes inwardly toward its rear end to confine the flow of water therethrough and thus assure the aforementioned pinching effect and also give a jet-like effect to the water passing though the annular member. However, when relatively larger propellers are used, the annular restriction is not essential and may be omitted.

Whether the craft be made with a single propulsive means which is mounted on the main axis of the craft or twin propulsive means on either side of the craft, it is desirable that the rudder be positioned directly in rear of the propulsive means and without any more space than is necessary to avoid contact with the hull and preferably supported by a rearwardly projecting portion of the hull or lower fin. It is desirable that the rudder be removably supported on a rudder post to facilitate adjustment or repair.

An object of the invention is to provide means for materially increasing the coefficient of propulsion in power driven water craft beyond any extent which has been heretofore attained.

Another object is to provide for the construction of a hull and its propulsive means so as to give a multiple stage propulsive effect by directing water angularly against the sides of the rear end of the hull and then diverting and propelling the streams directly from the rear end of the hull before they have had a chance to substantially intermingle with each other.

Another object is to construct a hull with its rear lateral sides converging in the direction of a common point and disposing the propulsive means with respect to these surfaces in such a manner as to divert the converging streams and direct them from the rear end of the craft to give a multiple stage propulsive effect, and to provide a lower surface on either lateral side of the hull projecting outwardly and forward of the propulsive means to prevent the latter from drawing water from beneath the lower surface of the hull.

Another object is to provide in a hull having twin propulsive means disposed on its opposite sides, side opening tunnels converging rearwardly in the direction of the main axis of the hull until they intercept the axes of the propulsive means to produce a primary pinching effect on the rear end of the hull, and then extending coaxial with the propulsive means to the rear end of the hull, and a rudder directly in rear of each of the propulsive means capable of normally steering the craft.

Another object is to provide a craft for shoal water navigation in which the hull is provided with a substantially flat bottom surface and with partially open side tunnels in either side of the rear end of the hull that project inwardly at an angle and within each of which is disposed a screw propeller whose axis coincides with the axis of the side tunnel to compel the water to reach the propeller through the side tunnel instead of being permitted to converge at random about the sides or bottom of the ship, and producing a two stage propulsion effect which consists of a pinching action on the rear end of the hull followed by a jet-like action at the rear of the hull before the opposing streams converge.

A further object is to provide in combination with a hull whose stern is formed with inwardly sloping surfaces that terminate at the propulsion means, a lower fin which prevents the propulsion means from drawing water from beneath the hull, and a rudder removably supported on either side of a central bearing and in rear of the propulsive means.

Other and further objects may become apparent from the following specification and claims, and in the appended drawings in which:

Fig. 4 is a plan view of another type of water craft embodying the invention and showing the rear end of a hull having twin propulsive means on either lateral side thereof;

Fig. 5 is a side elevational view of the structure shown in Fig. 4;

Fig. 6 is a rear view of the hull shown in Fig. 4; and,

Fig. 7 is a sectional view taken on line 7—7 of Fig. 5.

Referring now to the several figures of the drawings, the invention will be described in detail.

Figure 1:
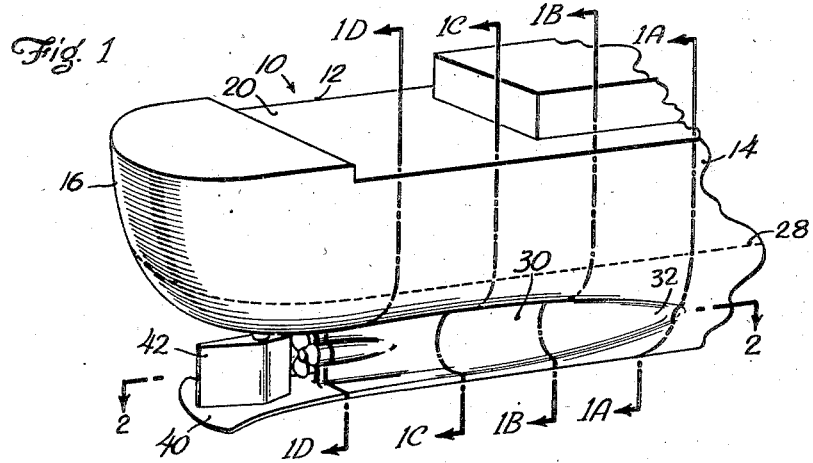
Fig. 1 is a perspective view of the rear end of one form of watercraft embodying the present invention.

Referring first to Fig. 1, which shows the invention in one of its forms, reference numeral 10 designates the hull of a ship of which only the rear end is visible, the front end being more or less conventional. The hull is composed of lateral sides 12 and 14 which at their rear upper limits converge to form the customary fantail 16. At their lower limits the lateral sides 12 and 14 are joined to a keel 18. The particular curvature of the sides 12 and 14 from the deck surface indicated at 20 to the keel 18 throughout the bow and midship portions are not important insofar as the present invention is concerned, for the reason that those portions of the hull are principally designed to accommodate the type of cargo and service for which the boat is intended.

Figure 1A:
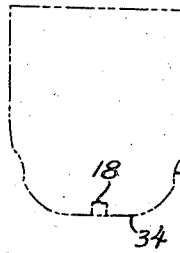
Figs. 1A–1D are sections taken on the respective lines of Fig. 1 and indicate sectional views of the rear end of the craft.
Figure 1B:
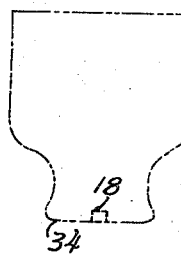
Figure 1C:
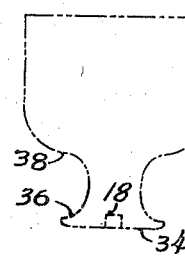
Figure 1D:
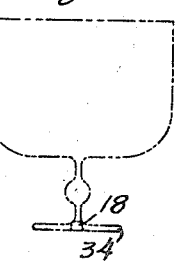

Extending along the axis of the hull from an engine, not shown, is a driven shaft 22, which penetrates the hull at its rearmost end indicated at 24 and carries a driven propeller 26 on its outer end contiguous to the rear-end of the hull. It is important that propeller 26 be as close as possible to the rear end of the hull, and without any substantial intervening space, since it is desirable that it act on the converging streams before they have lost the force of the converging effect. On either side of the lower rear portion of the hull, and below a dotted line indicated at 28, representing the normal water line of the craft, the hull has been constructed to form a pair of side opening tunnels designated by general reference numeral 30, which commence in each side of the hull substantially in front of the propeller and converge inwardly to the axis of the hull. In Figs. 1 and 1A, the commencement of the curvature of the side tunnel is in the form of an indentation indicated at 32. The curvature of each of the side tunnels progressively increases in area from the point of beginning to the rear-end of the hull as can be fully understood from inspection of Figs. 1, 1A–1D and Fig. 2. The lower surface of the hull is indicated by reference character 34 and the upper and lower surfaces of the side tunnels are indicated by reference characters 36, 38 and an examination of Figs. 1A–1D indicate that the side tunnels progressively increase in their curvature both above and below a center axis of each of the tunnels to form confining surfaces above and beneath the converging columns of water that are drawn therein and to maintain said columns separated until each is acted on by the propeller 26, which encompasses the axis of the converging columns of water drawn into the side tunnels. The side tunnels may be formed in any manner that is satisfactory, but in a practical application, the bottom surface 34 is in the form of a fin, or plate, which extends laterally on either side of the keel 18 and projects beneath the propeller 26, terminating in a fantail-like arrangement indicated at 40 in Figs. 1 and 2, forming a continuation of the lower portion of the side opening tunnels that acts to prevent the propeller from drawing water from beneath the craft.

In rear of the propeller 26, a rudder indicated at 42 is mounted on a stem 44, which projects between the plate 40 and the fantail 16 of the hull. This arrangement provides for removal and repair of the rudder when necessary, and subjects the rudder to the full force of the water being driven from propeller 26.

Figure 2:
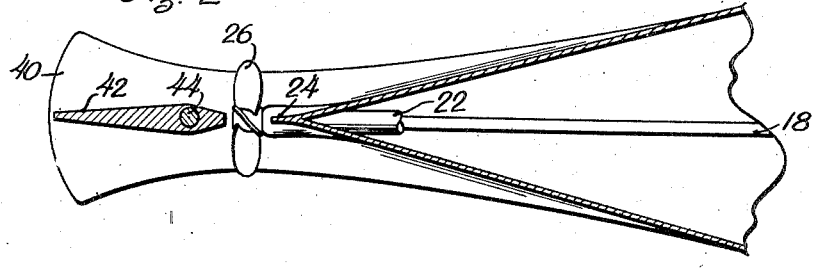
Fig. 2 is a longitudinal section taken on the line 2—2 of Fig. 1.
Figure 3:
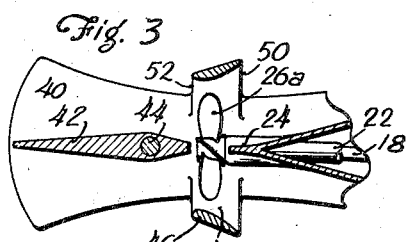
Fig. 3 is a sectional view of a fragmentary modification of a portion of the structure shown in Fig. 2.

Referring now to Fig. 3 is shown a modification of the construction shown in Figs. 1 and 2. Here, the propeller disclosed at 26a is enclosed within an annular restriction 46, whose inner surface 48 slopes inwardly from the front edge 50 to the rear edge 52 and forms a jet-like member about the periphery of propeller 26a. This annular member 46 is preferably used with ships that utilize smaller high speed propellers and would be omitted when larger propellers are used, as in the case of the disclosure of Figs. 1 and 2, where it may be assumed that a larger propeller is disclosed.

Assuming the hull 10 to be launched in a body of water sufficient in depth to extend to the water line 28, when the propeller 26 is driven, it will draw water from either lateral side of the ship angularly into the converging side opening tunnels 30, and because of the restriction formed by the plate 40 the streams of water thus drawn from the opposite sides of the hull increase in their converging intensity throughout the horizontal run of the side opening tunnels 30 to create a pinching effect of increasing intensity throughout the areas 36, 38 to the rear end 24 of the hull. This pinching effect in and of itself amounts to a first stage of propulsion tending to move the craft forward by displacement of the converging streams. It is highly important that the propeller be disposed directly in rear of the rear end 24 of the hull so as to act on the converging streams before they have actually intermingled with each other and lost their pinching effect. It will be noted in Fig. 2, that the point of convergence of the side opening tunnels 30 coincide with the axis of propeller 26 and therefore water drawn to the propeller is diverted from its converging influence and driven from the rear end of the hull either before or while the opposing streams intermingle. The annular member 46 seen in Fig. 3, when used tends to restrict the opposing streams and it also has a jet-like action on the water projected from the propeller 26a since the rear edge 52 is in rear of the propeller. The fin-like surfaces on either lateral side of the keel formed by plate 40 constitute the lower limits of the converging streams and prevent the propeller from drawing water upwardly from an area beneath the keel surface. Thus all of the water passing to the propeller 26 or 26a must come from the lateral sides of the ship, above the limits of the plate 40 and it is compelled to pass through the side tunnels before reaching the propeller. The reason for this is that water drawn from beneath the keel surface or at random from the sides of the hull adds little if any value to the propulsive effect and does not produce any influence on the desirable pinching action which is obtained when the water is drawn inwardly through the side tunnels before reaching the propeller.

The rudder 42, being directly in rear of propeller 26 and having portions extending on either side of the shaft 44, is capable of acting on the water immediately after the same is dispersed by the propeller and is therefore capable of giving high maneuverability to the craft. As mentioned heretofore, rudder 42 is capable of being dismounted from shaft 44 in the event that repair is necessary.

From the foregoing explanation it will be evident that the ship here described is propelled by a two stage effect. The first stage being the drawing of water into the sloping surfaces to form a pinching effect on the opposite sides of the rear end of the hull, and the second stage of propulsion being the diverting of the converging streams and drawing the same from the rear end of the hull before they have had an opportunity to substantially intermingle and thus lose the influence of their converging forces. Furthermore, the fin-like influence of plate 40 causes the propulsion means to act on those portions of the body of water that can effectively aid in propelling the craft without loss of propulsive energy by acting on non-essential portions of the body of water that supports the craft.

Referring now to Figs. 4–7, is shown a modified form of the invention, which is applicable to ships having twin propulsion means disposed on either lateral side of the hull. The hull 70, of which only the fragmentary rear portion is shown, would be more or less conventional at its front end but is formed of substantially greater beam than the hull shown in Figs. 1–3 in that the present hull might be applicable to freighters or to shoal water craft that operate on inland waterways and must have a relatively shallow draught. Hull 70 is provided with a fantail 72 and a relatively broad bottom or keel surface 74.

Disposed in either lateral side or rear end of the hull are flumes or side tunnels 75, 75a. Referring particularly to Fig. 5, it will be seen that side tunnel 75, which is identical in every respect to side tunnel 75a, starts at a point 80 which is in rear of the mid-portion of the hull, and projects inwardly to a point 81, seen in Fig. 4, after which its curvature turns slightly outwardly and terminates at the rear end of the hull beneath the fantail 72. The side opening tunnels of this modification are like those referred to in the disclosure of Figs. 1–3 in that they tend to converge in front of the rear end of the hull until they intercept the axes of the propellers whence they turn and extend coaxially with the propellers. From the point of origin 80 it will be seen that the side tunnel has an upper curving surface 82 and a lower curving surface 84. By further reference to Fig. 7 it will be evident that the surfaces 82, 84 extend beyond the axis of the driven shaft 86, which projects from the hull 70 into the side tunnel 75 and supports on its outer end a propeller 88. Surrounding propeller 88 is an annular member 90 which is secured to the rear end of the hull, and is identical in structure to the annular member 46, referred to hereinbefore. Extending from the rear end of annular member 90 is a plate 92. Rudder shaft 94 has one end journalled in a bearing 96 on plate 92 and is journalled at its other end in a bearing 98 which extends from beneath the fantail 72. A rudder 100 is removably supported on the rudder shaft 94 directly in rear of propeller 90.

For sake of convenience, all of the parts associated with side tunnel 75a bear the same reference numerals as the identical parts of side tunnel 75, except that the parts associated with side tunnel 75a are distinguished by a.

The operation of the boat shown in Figs. 4–7 will be relatively similar to that described heretofore in connection with the boat shown in Figs. 1–3. In the present instance the screw propellers 88, 88a direct water laterally into the side tunnels 75, 75a from beneath the water line here designated at 102 and above the bottom surfaces 84, 84a of the side tunnels. Since each of the side tunnels converge inwardly in the direction of the main axis of the hull, the streams drawn therein between the upper and lower edges 82, 84, 82a, 84a tend to converge but do not actually meet because of the distance between the outer ends of the side tunnels. Nevertheless, the streams exert lateral pressure against the inner surfaces of the side tunnels of an increasing intensity up to the points 81, 81a to provde the first propulsive effect after which they are diverted from their converging courses into paths parallel with the axes of the propellers and forced through the annular restrictions 90, 90a to produce the second propulsive effect. As will be noted in Fig. 6, the inner sides of the side tunnels separate the propellers from the bottom surface 74 of the hull so that the propellers can only draw water laterally into the side tunnels 75, 75a and that none comes from beneath the bottom surface 74.

The principal advantage of my invention in either disclosure resides in the multiple stage propulsive effect which enables boats so constructed to draw water laterally from the sides of the boat rather than at random from the sides of the hull or from beneath its lower surface. This arrangement produces a very high coefficient of propulsion which in the instance of shoal water craft is higher than has ever been obtained heretofore insofar as I am aware.

Another advantage resides in the fact that by use of a lower fin that prevents water coming to the propulsive means from beneath the boat, the hull is driven by water on its opposite lateral sides and is not depressed into the body of the water where it will decrease propulsive efficiency through greater resistance, and avoids the likelihood of being depressed into the bottom of the water bed if the boat is used on inland waterways which are of a relatively shallow nature.

While I have disclosed ship hulls having single and twin propulsive means, it should be understood that the invention is applicable to hulls of slightly differing designs and, therefore, my invention is limited only to the extent of the appended claims.

I claim:

1. A water craft, comprising a hull having spaced lateral sides, a substantially broad lowermost bottom surface, and a stern portion extending in a curve from the lowermost bottom surface between the lateral sides, a pair of driven shafts extending rearwardly from within the hull and penetrating the stern adjacent each of the lateral sides, a propeller secured to the outer end of each of the shafts, and side opening tunnels formed in each side of the hull starting in front of the area of penetration of the shafts and forming the opposite limits of a progressive curve in each side of the hull, the axis of said tunnels converging inwardly within the hull until each coincides with the axis of the respective shafts and then each extending coaxially about the respective shafts to the propellers, the inner surface of each of said tunnels continuously increasing in area extending above and beneath the driven shafts and terminating contiguous to the propellers, said tunnels acting to confine the water drawn therein by the propellers and forming columns of water on each side of the hull which are not substantially larger than the diameter of the propellers and effecting a continuously increasing water pressure against the inner sides of the tunnels in front of the propellers to produce a progressive pinching effect on opposite sides of the hull which reach their maximum condition when the axis of the side tunnels coincide with the axis of the propellers thereby producing a primary propulsive action on the hull prior to the action by the propellers, and producing a secondary propulsive effect upon action of the columns by the propellers, the lower extremity of each of said side tunnels separating the interior to said tunnels from the lowermost bottom surface of the hull to prevent the respective propellers from drawing water from beneath the lowermost bottom side of the hull.

2. A water craft, comprising a hull having spaced lateral sides, a substantially broad lowermost bottom surface and a stern portion extending in a curve from the lowermost bottom surface between the lateral sides, a pair of driven shafts extending rearwardly from within the hull and penetrating the stern adjacent each of the lateral sides, a propeller secured to the outer end of each of the shafts, an annular restriction circumscribing each of the propellers, and side opening tunnels formed in each side of the hull starting in front of the area of penetration of the shafts and forming the opposite limits of a progressive curve in each side of the hull, the axis of each of said tunnels converging inwardly within the hull until each coincides with the axis of the respective shafts and then each extending coaxially about the respective shafts to the annular restrictions, the inner surface of each of said tunnels continuously increasing in area extending above and beneath the driven shafts and acting to confine the water drawn therein by the propellers, forming columns of water on each side of the hull which are not substantially larger than the diameter of the propellers and effecting a continuously increasing water pressure against the inner sides of the tunnels in front of the propellers to produce a progressively increasing pinching effect on the opposite sides of the hull which reach their maximum condition when the axis of the side tunnels coincide with the axis of the propellers, thereby producing a primary propulsive action on the hull prior to the action of the propellers, and producing a secondary propulsive effect upon action of the columns by the propellers, the lower extremity of each of said side tunnels separating the interior of said tunnels from the lowermost bottom surface of the hull to prevent the respective propellers from drawing water from beneath the lowermost bottom side of the hull.

3. A water craft, comprising a hull formed with a rear end and spaced lateral sides, a side opening tunnel formed in each lateral side of the hull starting substantially in front of the rear end thereof and converging inwardly toward the main axis of the hull and thence extending to the rear end thereof on each side of the main axis of the hull, the inner surface of each of said tunnels from the starting point to the rear end of the hull progressively increasing in area above and below a central axis of each of said tunnels, and rotatable propulsive means journaled on the hull and situated contiguous to the rear end of said tunnels and rotating transverse to the rear end of each of said tunnels with the axis of rotation of said propulsive means on the same horizontal plane as the axes of said tunnels and the periphery of said propulsive means encompassing the axes of said tunnels and operating between the upper and lower limits of said tunnels, said propulsive means acting to draw water from the opposite sides of the hull into said tunnels and form columns of water on each side of the hull that tend to converge and thereby effect a continuously increasing water pressure against the inner sides of said tunnels in front of said propulsive means producing a primary propulsive action on the hull prior to the action of said propulsive means, the inner surfaces of said tunnels and the contiguous relationship of the propulsive means with the rear end of each of said tunnels on opposite sides of the main axis of the hull producing a secondary propulsive effect by action of the propulsive means on said columns before they intermingle, the lower extremity of each of said tunnels separating the interior thereof from the lowermost bottom surface of the hull to prevent said propulsive means from drawing water from beneath the lowermost bottom side of the hull.

4. A water craft, comprising a hull formed with a rear end and spaced lateral sides, a side opening tunnel formed in each lateral side of the hull starting substantially in front of the rear end thereof and converging inwardly toward the main axis of the hull and thence extending to the rear end thereof on each side of the main axis of the hull, the inner surface of each of said tunnels from the starting point to the rear end of the hull progressively increasing in area above and below a central axis of each of said tunnels, rotatable propulsive means journaled on the hull and situated contiguous to the rear end of said tunnels and rotating transverse to the rear end of each of said tunnels with the axis of rotation of said propulsive means on the same horizontal plane as the axes of said tunnels and the periphery of said propulsive means encompassing the axes of said tunnels, said propulsive means acting to draw water from the opposite sides of the hull into said tunnels and form columns of water on each side of the hull that effect a continuously increasing water pressure against the inner sides of the tunnels in front of said propulsive means producing a primary propulsive action on the hull prior to the action of said propulsive means, the inner surfaces of said tunnels and the contiguous relationship of the propulsive means with the rear end of each of said tunnels on opposite sides of the main axis of the hull producing a secondary propulsive effect by action of the propulsive means on said columns before they intermingle, and a fin-like member extending rearwardly in prolongation of a portion of the lower surface of said tunnels beneath said propulsive means and with the lower extremity of each of said tunnels forming a barrier between the lowermost bottom surface of the hull to prevent said propulsive means from drawing water from beneath the lowermost bottom side of the hull.

5. A water craft, comprising a hull formed with a rear end and spaced lateral sides, a side opening tunnel formed in each lateral side of the hull starting substantially in front of the rear end thereof and converging inwardly toward the main axis of the hull and thence extending to the rear end thereof on each side of the main axis of the hull, the inner surface of each of said tunnels from the starting point to the rear end of the hull progressively increasing in area above and below a central axis of each of said tunnels, and a single propeller journaled on the main axis of the hull and situated contiguous to the rear end of sail tunnels and rotating transverse to the rear end of both of said tunnels with the axis of rotation of said propeller on the same horizontal plane as the axes of said tunnels and the periphery of said propeller encompassing the axes of said tunnels and operating between the upper and lower limits of the rear end of both of said tunnels, said propeller acting to draw water from the opposite sides of the hull into both of said tunnels and forming columns of water on each side of the hull that tend to converge in front of the propeller and thereby effect a continuously increasing water pressure against the inner sides of both of said tunnels in front of said propeller producing a primary propulsive action on the hull prior to the action of said propeller, the inner surfaces of said tunnels and the contiguous relationship of the propeller with the rear end of each of said tunnels on opposite sides of the main axis of the hull producing a secondary propulsive effect by action of the propeller on said columns before they intermingle, the lower extremity of each of said tunnels separating the interior thereof from the lowermost bottom surface of the hull to prevent said propeller from drawing water from beneath the lowermost bottom side of the hull.

6. A water craft, comprising a hull formed with a rear end and spaced lateral sides, a side opening tunnel formed in each lateral side of the hull starting substantially in front of the rear end thereof and converging inwardly toward the main axis of the hull and thence extending the rear end thereof on each side of the main axis of the hull, the inner surface of each of said tunnels from the starting point to the rear end of the hull progressively increasing in area above and below a central axis of each of said tunnels, a single propeller journaled on the main axis of the hull and situated contiguous to the rear end of said tunnels and rotating transverse to the rear end of both of said tunnels with the axis of rotation of said propeller on the same horizontal plane as the axes of said tunnels and the periphery of said propeller encompassing the axes of said tunnels and operating between the upper and lower limits of the rear end of said tunnels, and an annular nozzle circumscribing said propeller, said propeller acting to draw water from the opposite sides of the hull into both of said tunnels and forming columns of water on each side of the hull that effect a continuously increasing water pressure against the inner sides of both of said tunnels in front of said propeller producing a primary propulsive action on the hull prior to the action of said propeller, the inner surfaces of said tunnels and the contiguous relationship of the propeller and nozzle with the rear end of each of said tunnels producing a secondary propulsion effect by the action of the propeller within said nozzle on said columns before they intermingle, the lower extremity of each of said tunnels separating the interior thereof from the lowermost bottom surface of the hull to prevent said propeller from drawing water from beneath the lowermost bottom side of the hull.

References Cited in the file of this patent

UNITED STATES PATENTS

| 154,978 | Baxter et al. | Sept. 15, 1874 |
| 1,801,875 | Melcher | Apr. 21, 1931 |
| 1,958,302 | Hanlon | May 8, 1934 |
| 2,030,375 | Kort | Feb. 11, 1936 |

FOREIGN PATENTS

| 283 | Great Britain | Jan. 17, 1883 |
| 617,775 | Germany | Mar. 26, 1936 |
| 634,472 | Germany | Aug. 28, 1936 |

OTHER REFERENCES

Kort Nozzle, published by Kort Nozzle Co., Inc., 17 Battery Place, New York. Copy received in Division 22 November 7, 1935, and on file in 115–42; page 11.